UNITED STATES PATENT OFFICE.

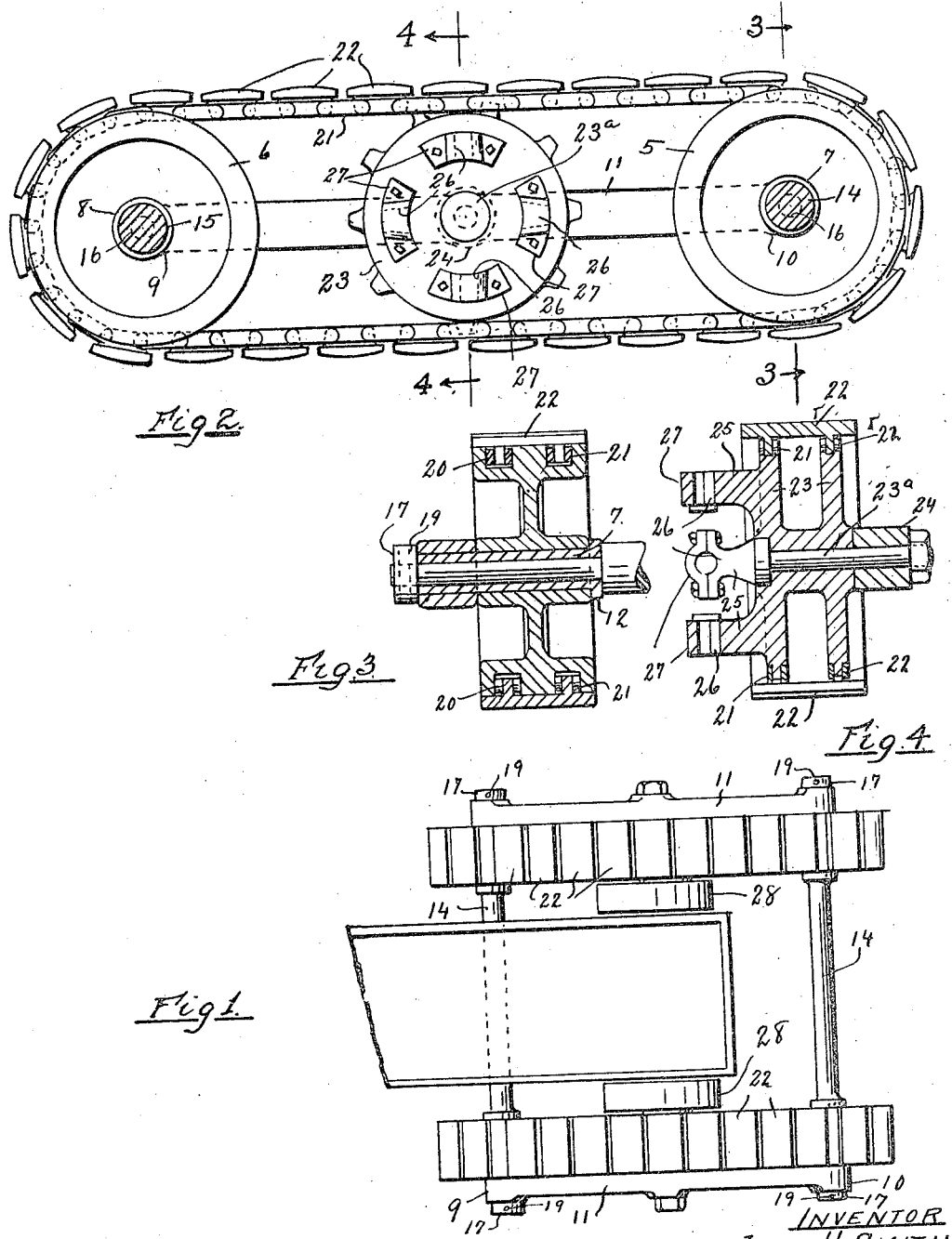

JOHN H. SMITH, OF LOS ANGELES, CALIFORNIA, ASSIGNOR OF ONE-HALF TO WILLIAM GOATMAN, OF LOS ANGELES, CALIFORNIA.

TRACTOR ATTACHMENT FOR VEHICLES.

1,263,137.  Specification of Letters Patent.  Patented Apr. 16, 1918.

Application filed May 14, 1917. Serial No. 168,410.

*To all whom it may concern:*

Be it known that I, JOHN H. SMITH, a citizen of the United States, residing at the city of Los Angeles, in the county of Los Angeles and State of California, have invented new and useful Improvements in Tractor Attachments for Vehicles, of which the following is a specification.

My invention relates primarily to an attachment for heavy vehicles such as motor trucks and the like (although it may be adapted for use with any type of vehicle) for use when it is desired to travel over or across soft or sandy roads or uneven ground.

Heretofore in the use of motor propelled vehicles, particularly trucks used for heavy hauling it has frequently happened that when passing over uneven or soft roadbeds the vehicle became stalled owing to the lack of traction between the wheels and the roadbed resulting in a considerable loss of time, inconvenience and damage both to the vehicle and the roadbed.

It is the object of my invention to provide an attachment which will obviate the above defects and which will be cheap in construction and simple and efficient in operation and which can be easily and quickly attached to or detached from a vehicle without altering the same.

A further object is to provide an attachment for self propelled vehicles whereby the same may be used in the preparation of ground for cultivation such as plowing, harrowing and the like.

Other objects and advantages will appear hereinafter.

I accomplish these objects by the device described herein and illustrated in the accompanying drawings forming a part hereof, in which:—

Figure 1 is a top plan of my attachment with a fragment of the rear end of a truck attached thereto.

Fig. 2 is an enlarged side elevation of one of the tractor wheels from the inner side.

Fig. 3 is a section on the line 3—3 of Fig. 2.

Fig. 4 is a section on the line 4—4 of Fig. 2.

Referring to the drawings my device comprises two duplicate side members connected together at their ends in spaced relation by cross shafts and as these side members are duplicates one only will be described, that being sufficient for the proper understanding of my invention.

In the drawings 5 and 6 indicate the end wheels or drums revolubly mounted on hollow sleeves 7 and 8 which sleeves are rigidly secured at one end in bearings 9 and 10 at each end of a side bar 11. Sleeves 7 and 8 are provided at their free ends with collars 12 and 13 which serve to retain wheels 5 and 6 in position thereon. Cross shafts 14 and 15 have their ends 16 reduced and these reduced ends are mounted in hollow sleeves 7 and 8, the said reduced ends being of sufficient length to project through said sleeves and have mounted thereon at the ends a retaining collar 17 by a pin 19, which collar serves to retain said reduced ends in position within said sleeves. Sprocket chains 20 and 21 are mounted to pass around and be supported by drums 5 and 6 and have secured on the outer faces thereof a plurality of shoes 22 which shoes form the tread. A sprocket wheel 23 is revolubly mounted on shaft 23ª mounted in a bearing 24 in side bar 11 intermediate the ends thereof and the teeth of said sprocket wheel engage chains 20 and 21 as hereafter explained. Extending outwardly from the side of sprocket wheel 23 are arms 25, of which I have shown four, which arms terminate in bearings 26 provided with removable caps 27. The outer periphery of bearings 26 and caps 27 are circular as best shown in Fig. 2, and are of a diameter to just fit within the run or felly of the vehicle wheels 28 when the device is in a position of use.

In the use of my device the bearings will be positioned within the felly of the vehicle with a spoke of the vehicle wheel 28 in each bearing. Caps 27 will then be placed in position and secured, thus connecting the sprockets to the wheels 28 of the vehicle, it being understood that the tractor is of a diameter sufficient to raise the vehicle wheel out of contact with the ground and that the vehicle will be jacked up while the device is being positioned.

In positioning my device, one side tractor member will first be positioned and its sprocket connected to one of the driving wheels 28 of the vehicle. The shafts 14 are then positioned beneath the body of the vehicle with one end positioned in sleeves 7 and 8 and secured therein.

The other side tractor member is then positioned in like manner and the device is then ready for use.

Having described my invention what I claim is:—

1. A tractor attachment for vehicles comprising duplicate tractor members mounted, one at each side of the vehicle; each of said members comprising a side bar extending longitudinally of the vehicle, said bar being positioned with its longitudinal center in register with the center of the rear wheel of the vehicle; a drum revolubly mounted at each end of said bar; a sprocket wheel revolubly mounted centrally of said bar adapted to be removably secured to the vehicle wheel concentrically therewith; an endless sprocket chain passing around said drums and engaging said sprocket wheel, said drums and wheel being larger in diameter than the vehicle wheel whereby the vehicle wheel is supported out of contact with the ground; a plurality of tread blocks secured upon the outer face of said chain; and a cross bar connecting the ends of said side bars.

2. A tractor attachment for vehicles comprising duplicate tractor members mounted, one at each side, on the vehicle, each of said members comprising a side bar extending longitudinally of the vehicle, said bars being positioned with their longitudinal centers registering with the centers of the rear wheels of the vehicle; connecting rods connecting said side bars at the ends thereof; a drum having a pair of spaced circumferential grooves therein revolubly mounted on each of the ends of said connecting rods; a pair of integral sprocket wheels revolubly mounted centrally of each of said side bars in alinement with the grooves of the drums adapted to be secured to the rear wheels of the vehicle; a pair of endless sprocket chains passing around the drums of each side member, within the grooves, and engaging the teeth of their respective sprocket wheels, said drums and sprockets being of a diameter sufficient to hold the rear wheels suspended from contact with the ground when positioned for use; and a plurality of tread blocks mounted on said chains and connecting each pair thereof.

3. A tractor attachment for vehicles comprising two endless sprocket chains mounted, one at each side of said vehicle at the rear end thereof, said chains being so positioned that the longitudinal centers thereof coincide or register with the centers of the rear wheels of the vehicle; supporting wheels for said chains spaced apart longitudinally of the vehicle around which said chains pass; supporting axles for said wheels extending transversely of the vehicle; side bars connecting the axles of the supporting wheels at each side of the vehicle; a sprocket wheel revolubly mounted in each of said bars adapted to be detachably connected to the rear wheels of the vehicle concentrically therewith whereby when said rear wheels are rotated said sprocket chains will be caused to travel around said drums; and a plurality of tread blocks carried by said chains.

In witness that I claim the foregoing I have hereunto subscribed my name this 23rd day of October, 1916.

JOHN H. SMITH.